United States Patent [19]
Quandt

[11] Patent Number: 5,570,859
[45] Date of Patent: Nov. 5, 1996

[54] AERODYNAMIC BRAKING DEVICE

[76] Inventor: Gene A. Quandt, P.O. Box 4398, Pocatello, Id. 83205

[21] Appl. No.: 370,371

[22] Filed: Jan. 9, 1995

[51] Int. Cl.$^6$ ................................................. B64C 27/72
[52] U.S. Cl. .................... 244/213; 244/113; 244/215; 416/23; 416/14
[58] Field of Search ............................... 244/213, 215, 244/216, 217, 113; 416/23, 24, 37, 14

[56] References Cited

U.S. PATENT DOCUMENTS

| | | | |
|---|---|---|---|
| 1,293,228 | 2/1919 | Sopwith | 244/113 |
| 1,389,757 | 9/1921 | Haynes | 244/113 |
| 1,423,131 | 7/1922 | McNamara | 244/113 |
| 2,138,326 | 11/1938 | Pouit | 244/113 |
| 4,015,787 | 4/1977 | Maieli et al. | 244/113 |
| 4,297,076 | 10/1981 | Danham et al. | 416/37 |

FOREIGN PATENT DOCUMENTS 609064  9/1948  United Kingdom ................... 244/113

Primary Examiner—Galen L. Barefoot
Attorney, Agent, or Firm—Dean P. Edmundson

[57] ABSTRACT

A spoiler flap is pivotably mounted to the rearward portion of a wind turbine blade or wing to control or influence air flow over the surface of the blade or wing. The spoiler flap has forward and rearward edges. The spoiler flap can be pivoted to simultaneously raise the forward edge (into low pressure flow) and lower the rearward edge of the spoiler flap (into high pressure flow). The extent to which the spoiler flap is pivoted determines the extent to which the air flow over the surface of the blade or wing is influenced. When the spoiler flap is fully deployed or pivoted, it serves as a braking device. When it is only partially pivoted, it serves the function of power modulation.

14 Claims, 11 Drawing Sheets

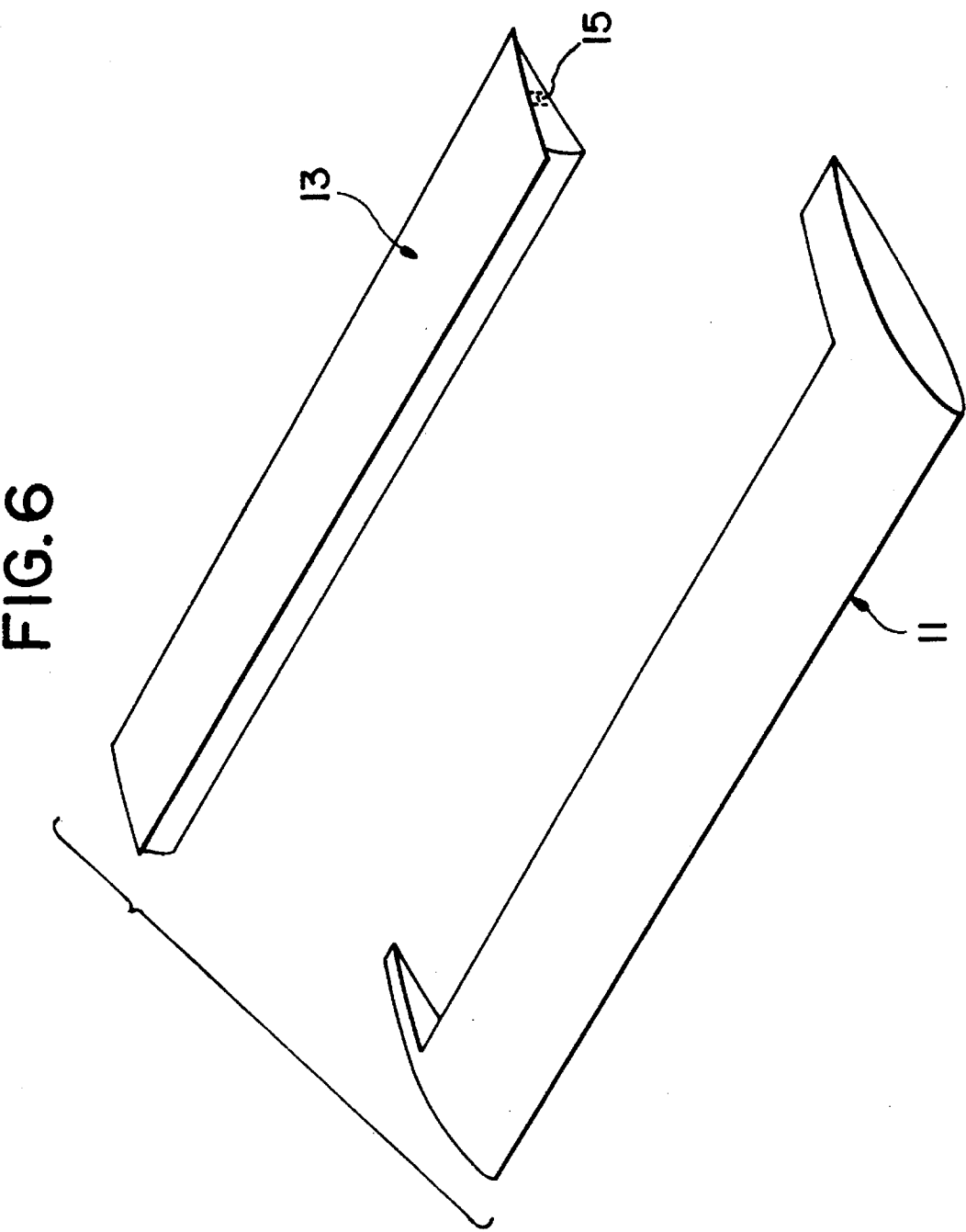

5,570,859

AERODYNAMIC BRAKING DEVICE

FIELD OF THE INVENTION

This invention relates to apparatus and techniques for controlling the aerodynamic forces on a wind turbine or the wings of a flying vehicle. More particularly, this invention relates to an aerodynamic braking device.

BACKGROUND OF THE INVENTION

Wind turbines typically utilize a plurality of blades which are caused to be turned by the force of wind passing over the blades. Rotation of the blades by the wind drives a central shaft which is typically connected to an electrical generator.

To prevent an overspeed condition during storms or high wind conditions, some turbines have the capability to vary the pitch of the blades to reduce the rotational speed of the turbine. This prevents the turbine from rotating at an unsafe speed, but such systems are complex and expensive.

Other types of systems have also been used for preventing overspeed conditions. For example, U.S. Pat. No. 4,180,372 describes a brake system which involves a spring-loaded plate which is hinged on the tip of the rotor blade in a manner such that it rotates outwardly due to centrifugal force resulting from overspeed conditions. Such system is limited to being mounted on the very tip of the turbine blade.

U.S. Pat. No. 2,074,149 describes a braking system in a propeller in which the tips of the propeller can rotate due to inertial loads of a rotating blade on a cam surface.

U.S. Pat. No. 2,126,202 describes a governor for a wind motor. The device includes paddles on the outer ends of a barrel secured at its center to the hub of the motor. As the rotational speed increases, the paddles are turned or rotated so that they present resistance to movement through the air, thereby retarding rotational speed of the wind motor.

U.S. Pat. No. 2,302,054 describes a variable pitch wind motor in which the blades can be turned to prevent an overspeed condition even in high winds.

U.S. Pat. No. 2,437,659 describes a balanced impeller structure for wind motors. Spoilers are mounted externally to the blades and they can be rotated in a plane perpendicular to the plane of blade rotation.

U.S. Pat. No. 2,493,895 describes a propeller blade having flaps hingedly attached to its surface. The flaps are caused to pivot outwardly into the air when the propeller rotates at very high speed.

U.S. Pat. No. 4,082,479 describes an overspeed spoiler for vertical axis wind turbines. The spoiler is hinged to the airfoil and is held against the surface of the airfoil with a spring. At a predetermined rotor speed the spoiler pivots against the spring force and becomes transverse to the air flow to increase drag.

U.S. Pat. Nos. 4,297,076 and 4,374,631 describe a wind turbine in which the tip portions of the blades are variable in pitch to control yaw and relieve bending moments on the blades. The tips also control overspeed.

U.S. Pat. No. 4,355,955 describes a wind turbine rotor speed control. The blade tips can be rotated or pivoted in response to movement of tabs pivotally attached to the trailing edges of the blade.

U.S. Pat. No. 4,431,375 describes a wind-driven generator having variable pitch blades.

U.S. Pat. No. 4,500,257 describes a spoiler system in which the spoilers on the blades are initially stored near the rotor axis. A latch releases the spoilers and centrifugal force causes the spoilers to move up the turbine blades away from the rotor axis to produce a braking effect.

U.S. Pat. No. 4,571,156 describes an air foil with a trailing spoiler which is flexible and resilient. The portion of the spoiler that extends past the trailing edge bends toward the wind during high wind conditions to prevent overspeeding.

U.S. Pat. No. 4,867,642 describes a wind mill with an air brake. The wing tip is automatically turned out when the speed of rotation of the wing exceeds a certain level. There has not heretofore been described an aerodynamic braking device having the features and advantages provided by the present invention.

SUMMARY OF THE PRESENT INVENTION

In accordance with the present invention there is provided an aerodynamic braking device comprising a spoiler flap which is pivotably mounted in the rearward portion of a wind turbine blade or a wing. The spoiler flap has forward and rearward edges. When the spoiler flap is pivoted, this simultaneously raises the forward edge of the flap (into low pressure flow) and lowers the rearward edge of the flap (into high pressure flow).

The spoiler flap spans only a selected portion of the local blade or wing chord. The flap does not have to be located at the tip of the blade or wing in order to be effective. Also, the spoiler flap can be completely stowed inside the airfoil shape of the blade or wing, thereby resulting in minimal drag during power production.

When the spoiler flap is only partially rotated or pivoted from its stowed position, it can be used for power modulation. When the spoiler flap is pivoted to a greater extent, it can be used for aerodynamic braking purposes.

When the device of this invention is used on a turbine blade, the overall turbine blade thrust and flapwise bending moments are reduced.

The spoiler flap is pivoted about an axis which extends through the length of the flap and which is preferably generally parallel to the upper and lower surfaces of the flap. The axis is preferably located about midway between the forward and rearward edges of the flap. This results in small hinge moments and actuating loads.

There may be more than one of the braking devices on a single turbine blade, if desired.

The braking device can be actuated during a blade overspeed condition by its own centripetal acceleration or by a separate active or passive actuator.

Other advantages of the braking device of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which:

FIG. 6 is an exploded view of a portion of an airfoil incorporating a braking device of the invention;

DETAILED DESCRIPTION OF THE INVENTION

Figure 1:
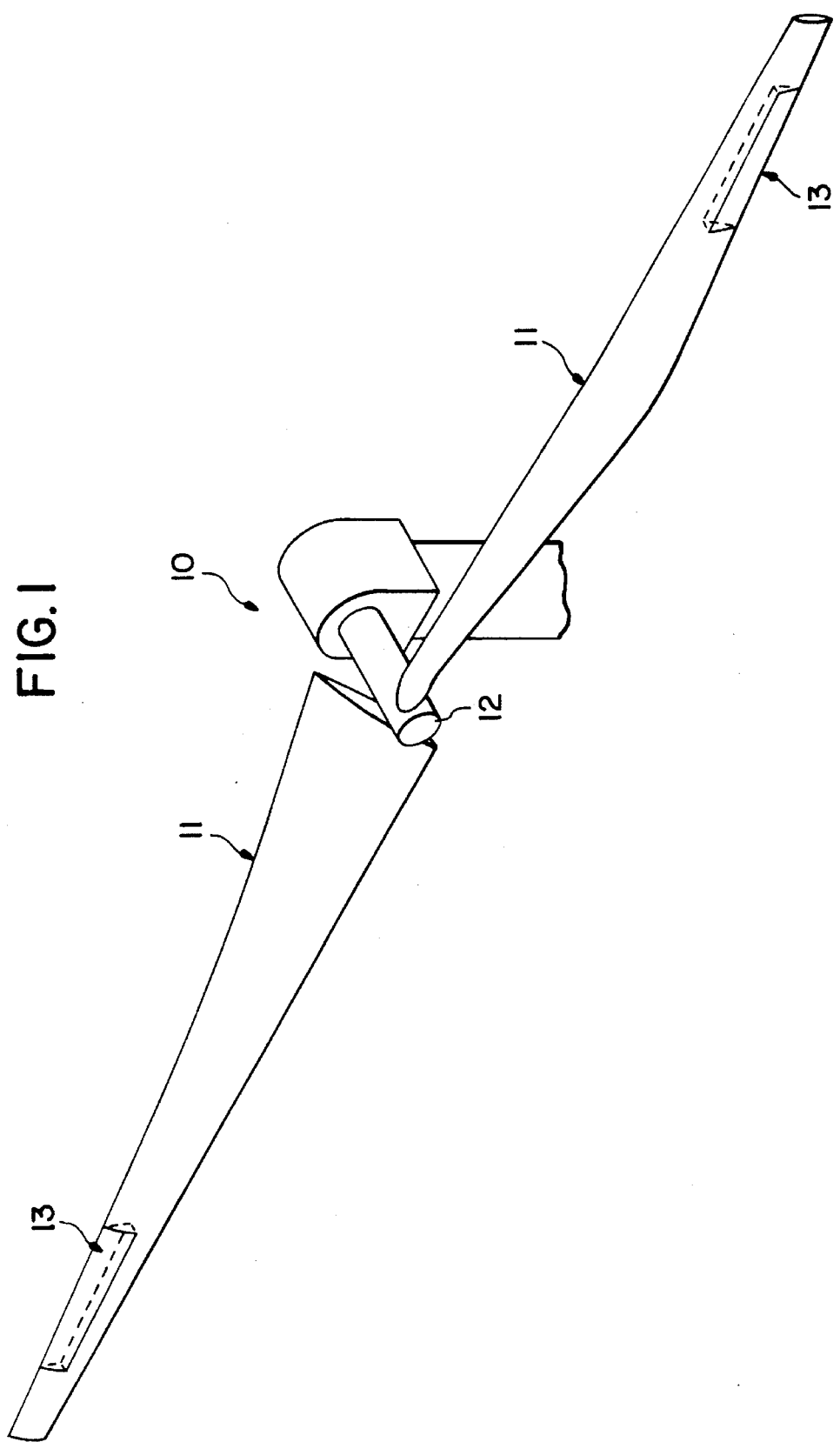
FIG. 1 is a perspective view of a wind turbine which includes aerodynamic braking devices of the invention.

The aerodynamic braking device of this invention is extremely useful in wind turbine blades and aircraft wings. The braking device comprises a spoiler flap which is mounted in the aft segment of the turbine blade or wing. The body of the braking device forms a portion of the local trailing edge of the turbine blade or wing. As illustrated in the drawings, the braking device has a length less than the length of the turbine blade or wing in which the braking device is mounted.

The aerodynamic braking device can be used to actively control aerodynamic forces on wind turbine blades or the wings of a flying vehicle. The braking device or spoiler flap can be pivoted about an axis that runs spanwise with the turbine blade or aircraft wing so that (a) the leading edge (i.e., the most forward section of the braking device) is raised and projects into the flow field on the low pressure side of the blade or wing and (b) simultaneously rotates the trailing edge (i.e., the most aft section of the device) into the flow field on the high pressure side of the blade or wing. The resultant effects on the wind turbine blade or wing are a reduction in lift force and an increase in drag force.

The most important characteristic for turbine blade control is the chord force coefficient (i.e., Clsin (angle of attack) - Cdcos (angle of attack), where Cl and Cd are the lift coefficient and drag coefficient, respectively). The ability of a device to predictably and substantially control chord force is the best measure of a control device effectiveness.

In FIG. 1 there is shown a perspective view of a wind turbine 10 having two blades 11 connected to a shaft 12. When wind passes over the turbine blades, the blades rotate shaft 12 in a counter-clockwise direction. Each blade includes a braking device or spoiler flap 13 in accordance with this invention. The spoiler flap is mounted to the aft segment of the turbine blade and the body of the device forms the local trailing edge. As illustrated in the drawings, preferably the spoiler flap has a shape and contour which is the same as that of the turbine blade or wing in which it is mounted.

Figure 2:
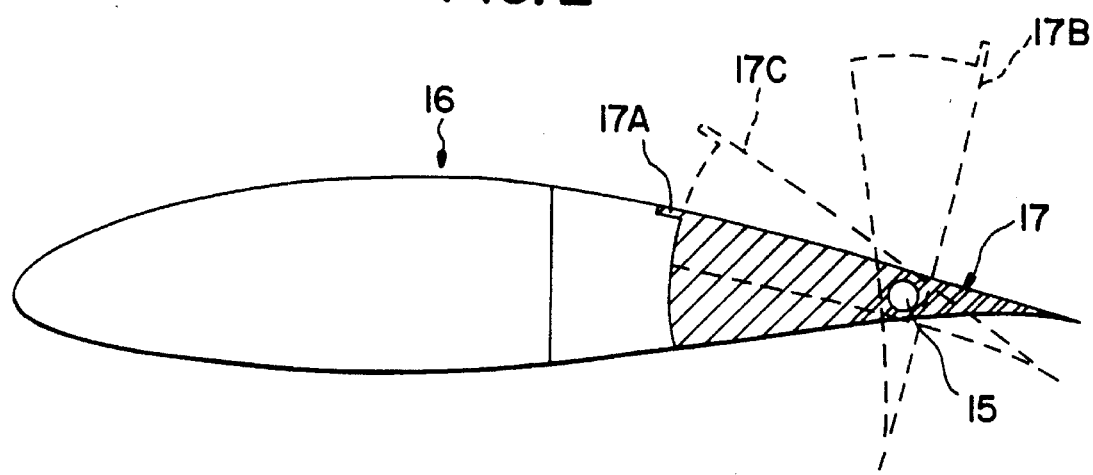
FIGS. 2 and 3 are side elevation, partially cutaway views of an air foil or turbine blade which includes an aerodynamic braking device of the invention.
Figure 3:
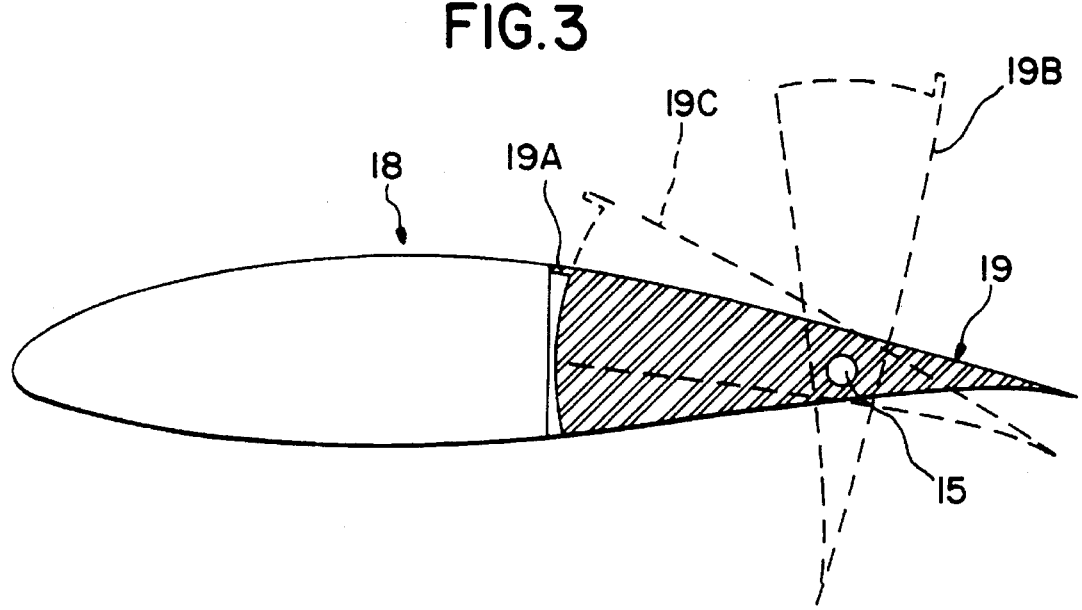

FIGS. 2 and 3 are side elevational views showing a turbine blade or wing which includes a braking device of the invention. In FIG. 2 the turbine blade 16 is shown with a spoiler flap 17 pivotably mounted in the aft section of the blade on shaft or axis 15 (which is approximately parallel to the upper and lower surfaces of the spoiler flap). The axis is also preferably parallel to the longitudinal centerline of the turbine blade. The forward upper edge of the spoiler flap preferably includes a forwardly-projecting lip 17A.

In FIG. 3 the turbine blade 18 is shown with spoiler flap 19 mounted in the aft section of the blade. The spoiler flap includes a forwardly-projecting lip 19A on its forward upper edge.

As shown, the spoiler flap in FIG. 2 comprises about 40% of the total airfoil chord length, whereas in FIG. 3 the spoiler flap comprises about 50% of the total airfoil chord length. The shape or contour of the spoiler flap is preferably the same as that of the aft section of the airfoil, as illustrated in the drawings.

Dotted lines 17C and 19C in FIGS. 2 and 3, respectively, illustrate the angular position of spoiler flaps 17 and 19 when in a control position. Dotted lines 17B and 19B illustrate the angular position of flaps 17 and 19 in the braking position. In other words, when the forward edge of spoiler flap is raised slightly (which simultaneously lowers the rear edge of the flap) the spoiler flap serves to control performance of the turbine blade in which it is mounted. When the spoiler flap is pivoted to position 17B (and 19B) it is generally perpendicular to air flow over the airfoil and therefore serves as a brake over a wide device angle of attack.

Figure 4B:
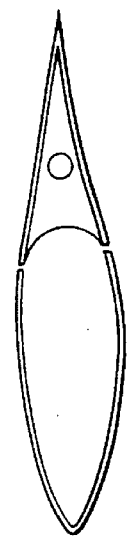
FIGS. 4A and 4B are side elevational views of air foils including braking devices of different configurations.
Figure 4A:
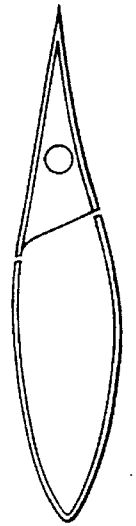

FIG. 4 illustrates side views of two air foils which include spoiler flaps of different styles. In each of these particular variations the mounting axis is inside the spoiler flap, i.e., between the upper and lower surfaces of the flap.

Figure 5C:
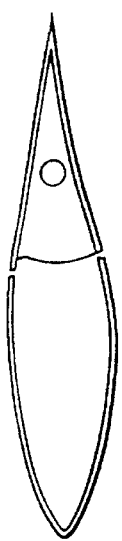
FIGS. 5A through 5C are side elevational views of air foils including braking devices of different sizes and configurations.
Figure 5B:
Figure 5A:
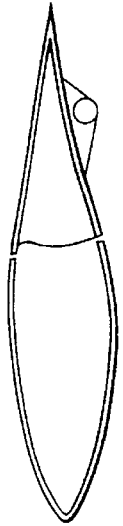

FIG. 5 also illustrates side views of several air foils which include spoiler flaps of different styles. In versions A and B the mounting axis for each spoiler flap is located externally of the flap. As illustrated, the mounting axis in these versions is below the lower surface of the flap. The chord length of the spoiler flaps also vary in each version shown. In version C the mounting axis is internal. The leading edge shape is not as important as the position of the lower and upper surface fixed blade trailing edges. The lower and upper surface must terminate within 10% of chord of each other. This constraint will ensure that an acceptable gap for the device is maintained for the braking configuration.

In FIG. 6 there is shown an exploded view of a portion of a wind turbine blade 11 and spoiler flap 13. The flap 13 is mounted on a shaft 15 which may extend through the length of the flap 13 and which is attached on its opposite ends to blade 11. The flap can pivot on shaft 15 to control air flow over the blade or to act as a brake.

Figure 7:
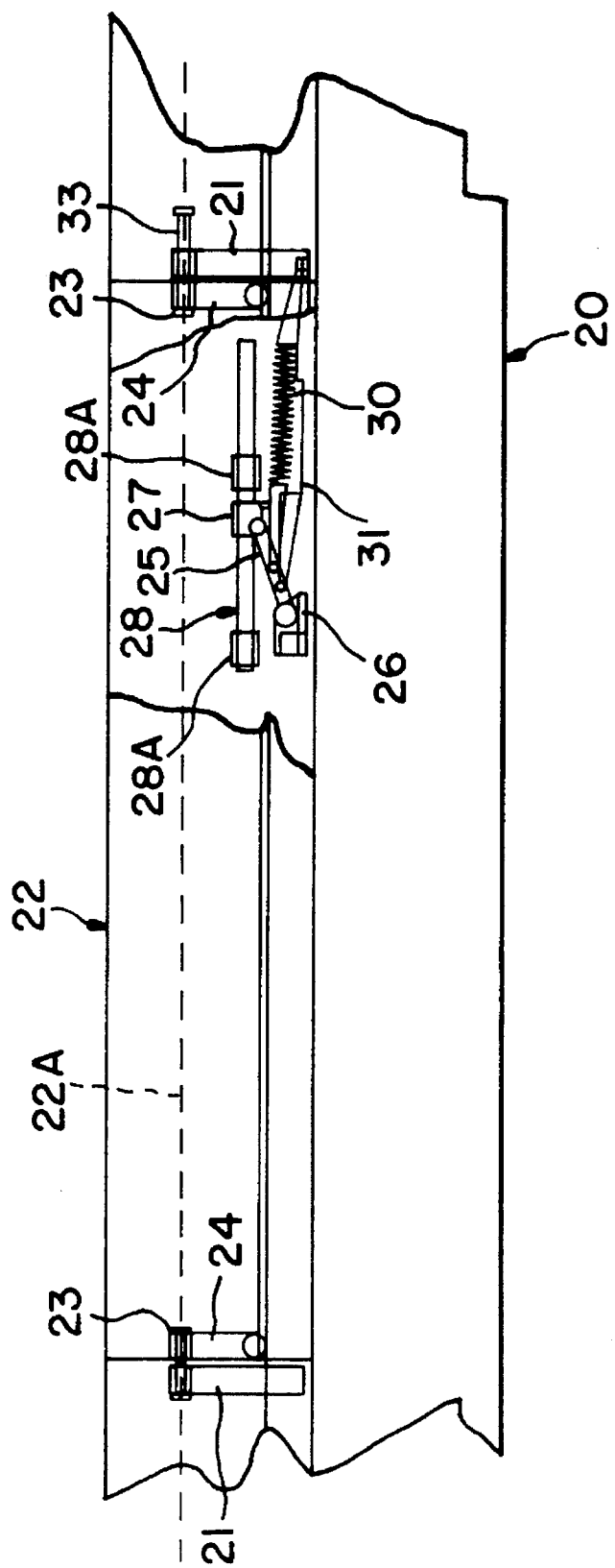
FIG. 7 is a plan view, partially cutaway, of an air foil and braking device of the invention with one type of actuating mechanism.

FIG. 7 is a plan view of a turbine blade 20 which includes a spoiler flap 22 which is attached at its ends to brackets 21 secured in the blade or wing. A shaft 23 extends through each bracket 24 in opposite ends of the flap and through each bracket 21. Flap 22 can pivot with respect to blade 20 on axis 22a. Actuator link 25 is connected between link support 26 in the blade and bearing lug 27 on the rotating linear bearing 28 which is supported in flap 22 by members 28A fixed in flap 22. Return spring 30 is secured at one end to link 25. Damper 31 is also secured at one end to link 25. Damper 31 and spring 30 are secured at their opposite ends to bracket 21. Trigger spring 33 is compressed to the maximum predeployment centrifugal load of the spoiler flap 22. As the maximum rotational speed of the rotor blade 20 is reached, the spoiler flap displaces toward the tip further compressing spring 33 initiating a passive spoiler flap 22 deployment. As the rotational deployment begins, linear bearing 28 translates toward the tip, thereby carrying bearing lug 27, and rotating actuator link 25. Return spring 30 and damper 32 elongate as link 25 rotates following deployment of the spoiler flap 22. Linear bearing 28 translates through member 28A. Until bearing lug 27 translates to the outboard stop 28A, the spoiler flap 22 will return to the stowed position when aerodynamic forces are less than the return spring force.

Figure 8:
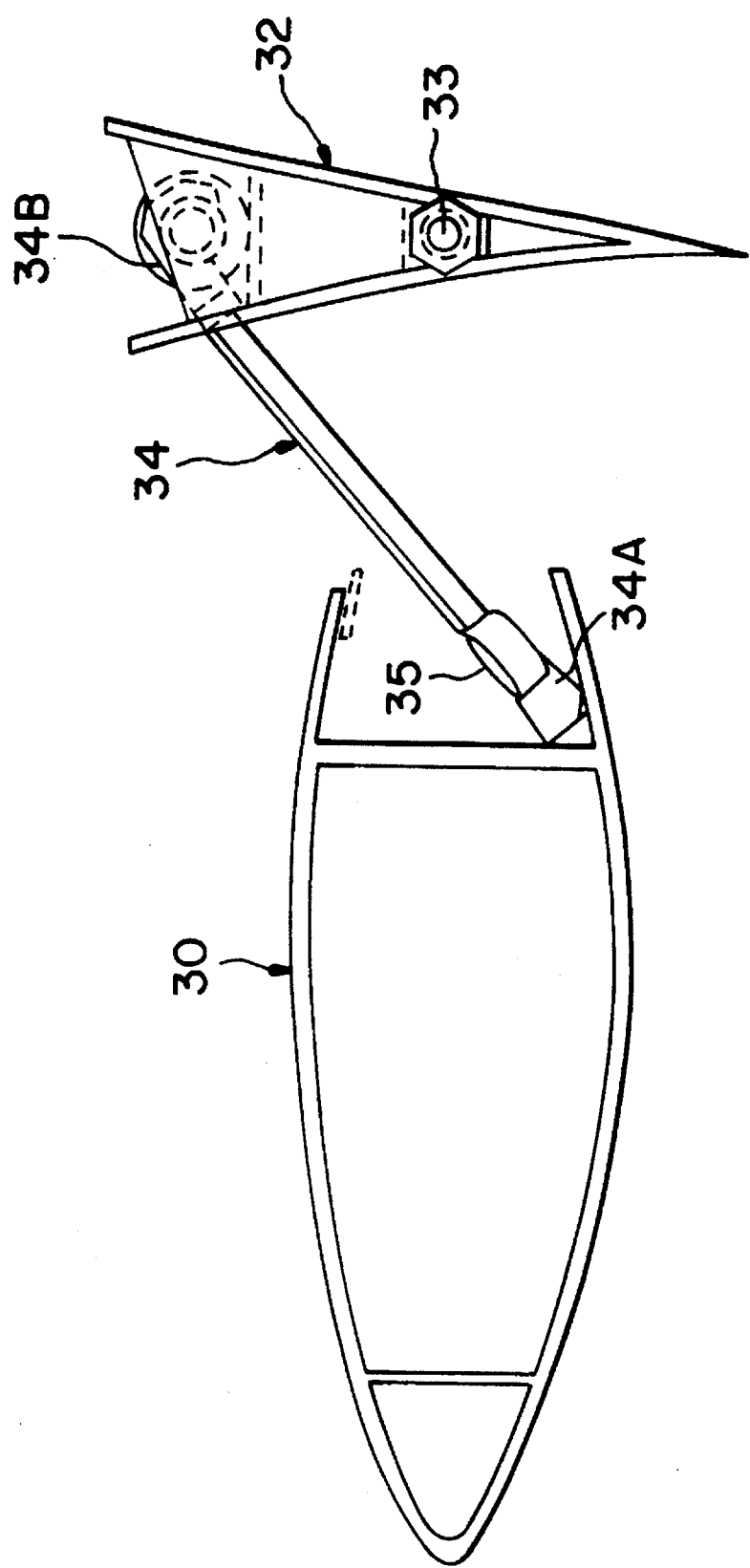
FIG. 8 is a side view of an air foil including a braking device of the invention with another type of actuating mechanism.

FIG. 8 is a side elevational cutaway view of a turbine blade or wing 30 whose aft section includes a pivotable spoiler flap 32 mounted on shaft or axis 33. An actuator link 34 is attached at one end 34A to the fixed blade segment and is attached at its other end 34B to the forward end of the spoiler flap. End 34A includes an actuator 35 for extending link 34 to cause the spoiler flap to pivot or rotate about axis 33. A return spring and damper between the spoiler flap and the fixed segment of the blade may be included, if desired. In FIG. 8 the spoiler flap is shown in its fully extended or fully pivoted position (perpendicular to the centerline of the fixed segment of the blade).

Actuator 35 can be, for example, a rotary actuator controlled by an electrical signal.

Figure 9:
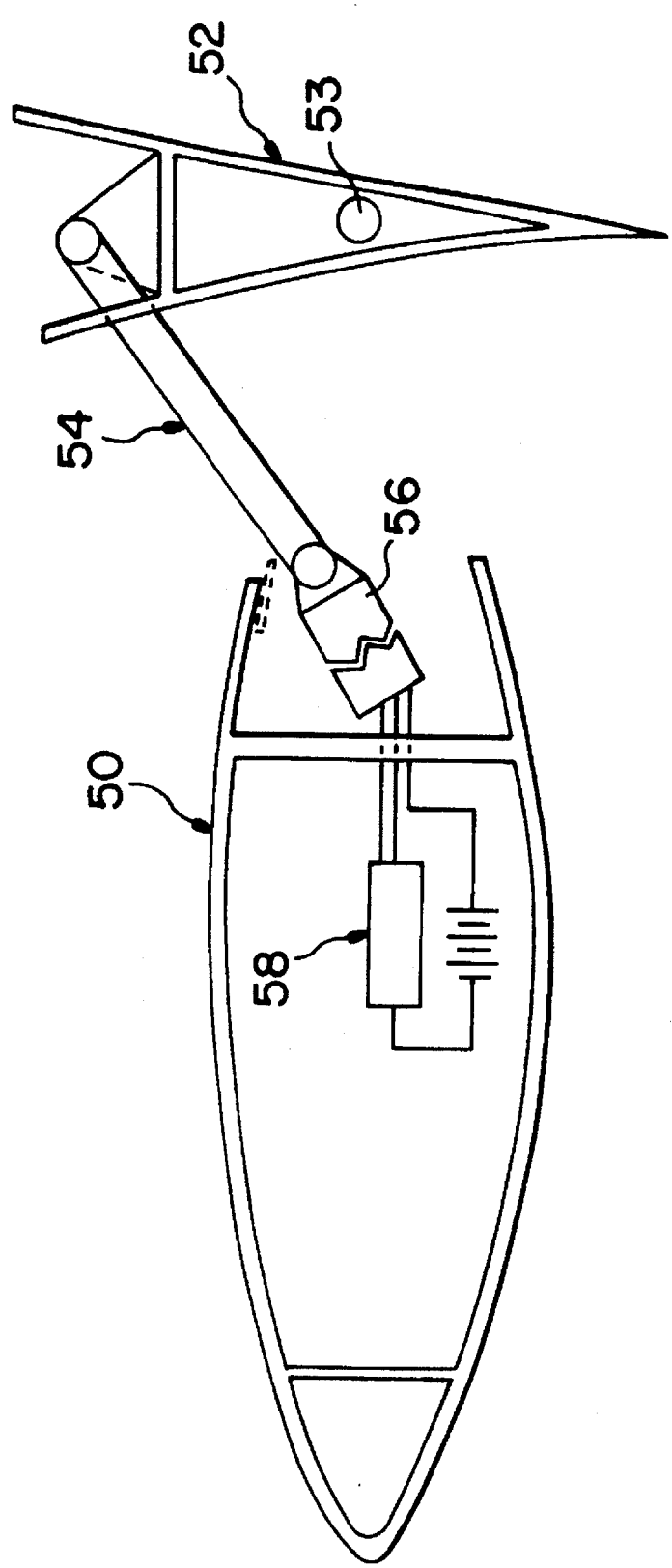
FIG. 9 is a side view of an air foil and braking device with yet another type of actuating mechanism.

FIG. 9 shows another embodiment of turbine blade 50 with a pivotable spoiler flap 52 which pivots on shaft or axis 53. An actuator drive link 54 is attached at one end to the forward end of the spoiler flap and is attached at its other end to an electromechanical actuator 56 for extending and retracting the link 54. The sensor 58 is known in the art and is capable of sensing an overspeed condition of the blade and initiate movement of the actuator 56 at specific wind speeds.

Figure 10:
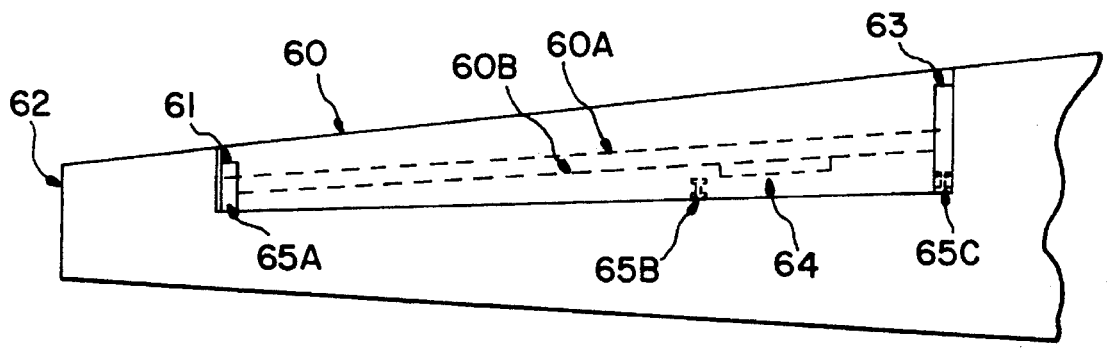
FIG. 10 is a plan view of a turbine blade which includes a spoiler flap of this invention.

FIG. 10 is a plan view of a turbine blade 62 with a spoiler flap 60 incorporated at the trailing edge of the blade. The spar centerline is indicated as 60B, and the hinge line of the spoiler flap is denoted as 60A. Outboard rib 61 and inboard rib 63 on opposite ends of the flap serve as attachment points to the turbine blade. A rotating translating bearing 64 is carried by the flap 60. Magnets 65A, B and C are carried by the forward edge of the flap 60.

Figure 11:
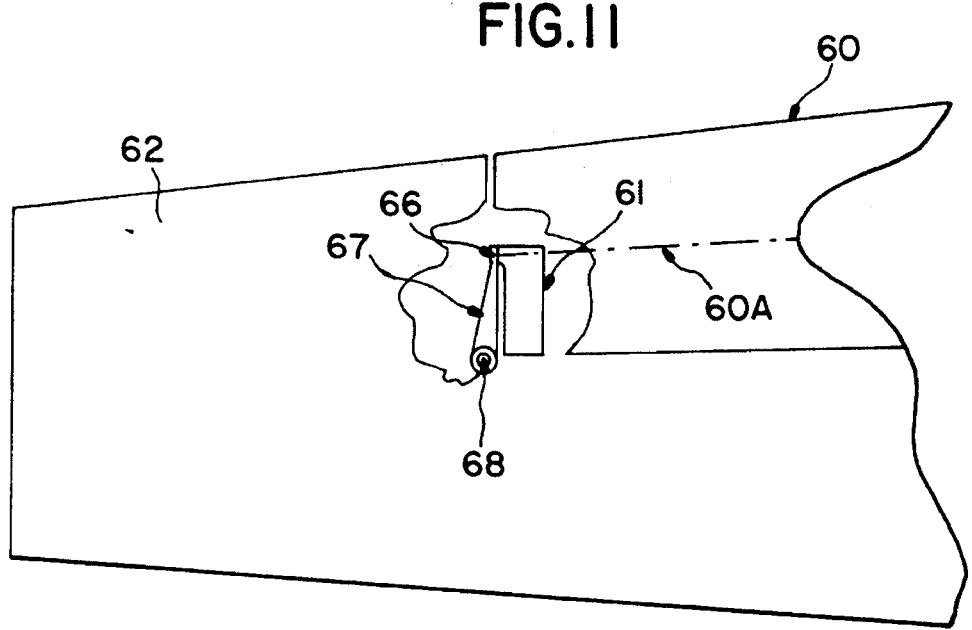
FIG. 11 is a plan view, partially cut-away, of the outer end portion of the blade and spoiler flap shown in FIG. 10.
Figure 12:
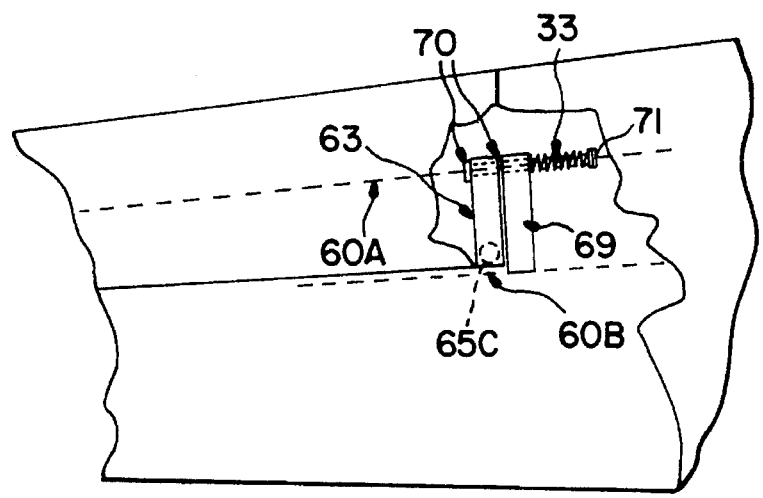
FIG. 12 is a plan view, partially cut-away, of the inner end portion of the blade and spoiler flap shown in FIG. 10.

As shown in FIG. 11, the outboard rib 61 is pivotally attached to hinge link 67 which is secured in blade 62 at spherical joint 66. The joint is free to move spanwise because of joint 68 which is a revolute joint with its axis of rotation normal to the local chord plane. Joint 66 and joint 68 form a floating hinge on the outboard end of the spoiler flap. This configuration allows relative motion between the blade and the spoiler flap. This allows the spoiler flap to be actuated by a relative translation of the flap to the blade with little loss in stiffness with respect to vertical motion at the hinge. The gap between the flap and the blade is nearly closed during the deployment of the flap. For normal overspeed deployment the pivot rotates approximate 5° to enable a 0.25 inch spanwise translation of the flap. The flap then begins to rotate on the ball of the spherical joint 66. As soon as the blade begins to slow its rotation, the pivot 68 rotates back and the flap remains deployed with the pivot in its original position. The translation is guided by the translating revolving joint shown in FIG. 12 at the inboard end of the device.

The inboard hinge fitting carries both spanwise and transverse loads and acts to support the inboard magnet attachment. The inboard flap rib 63 is entrapped by thrust bearings 70 that allow rotation and carry the spanwise loads to the inboard hinge fitting 69 through bolt 71. The preloaded spring 33 urges the bolt 71 toward the hub of the turbine blade.

The magnets 65A, B, and C under the forward edge of the spoiler flap are designed to carry only aerodynamic moment. They are designed to disengage at a spanwise displacement of 0.25 inch.

Figure 13A:
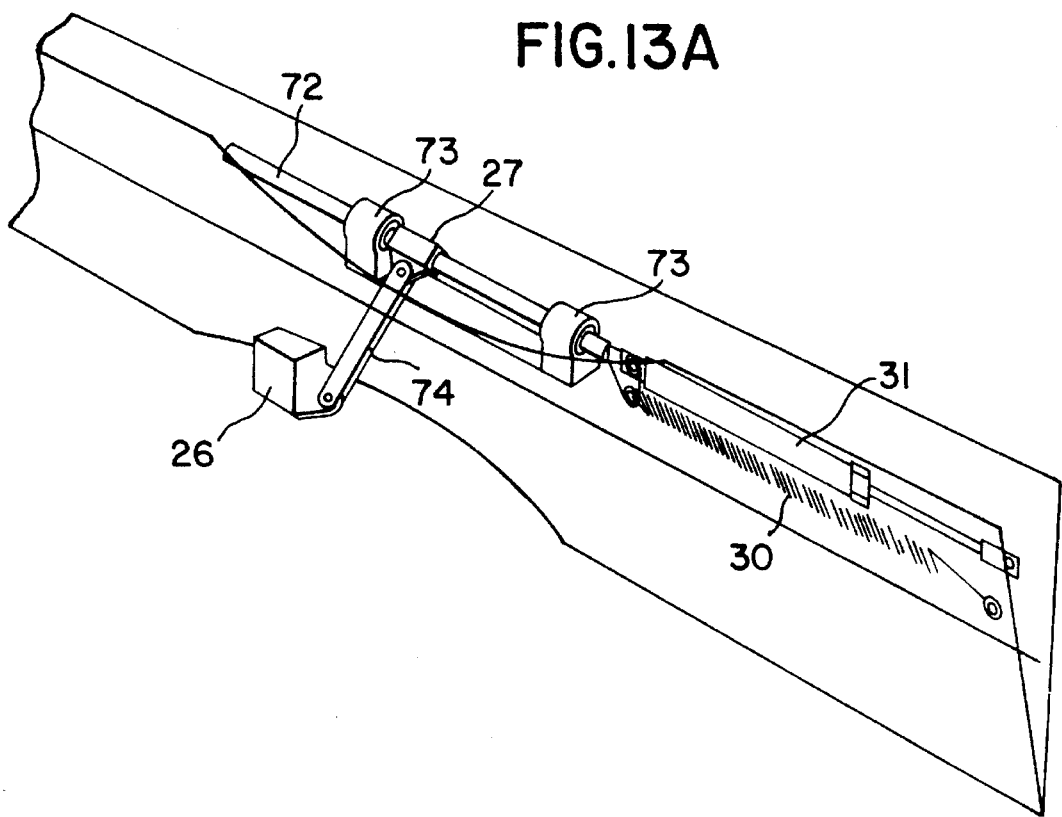
FIG. 13A illustrates a passive actuation system in a deployed position.
Figure 13B:
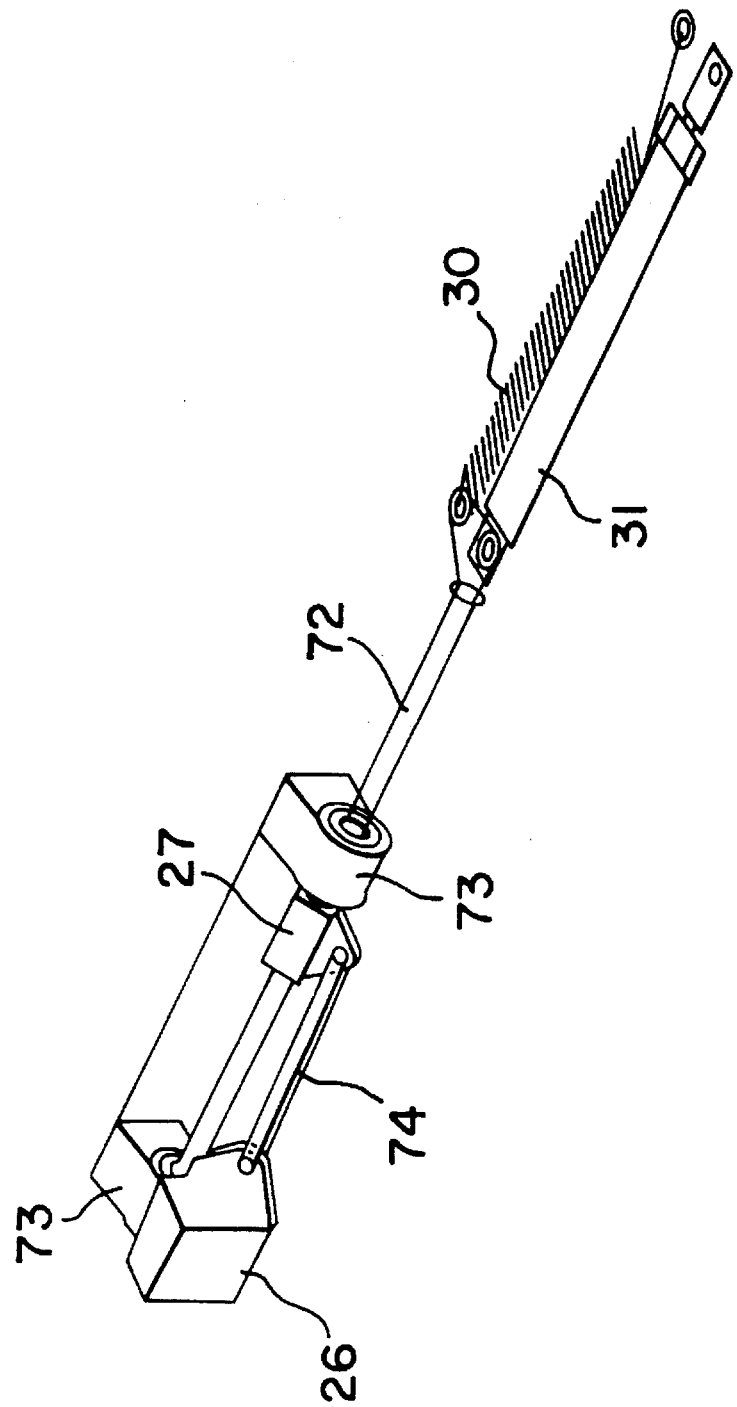
FIG. 13B illustrates the passive actuation system in stowed position.

FIG. 13A shows a passive actuation system in a deployed position, and FIG. 13B shows the actuation system in a stowed position. The linear bearing 72 is able to move spanwise in mountings 73. Linear bearing lug 27 on bearing 72 is connected to actuator link 74. Return spring 30 and damper 31 are secured at one end to inboard flap rib 63. Their opposite ends are secured to one end of bearing 72. The mechanism is similar to that shown in FIG. 7 in all other respects.

Figure 14:
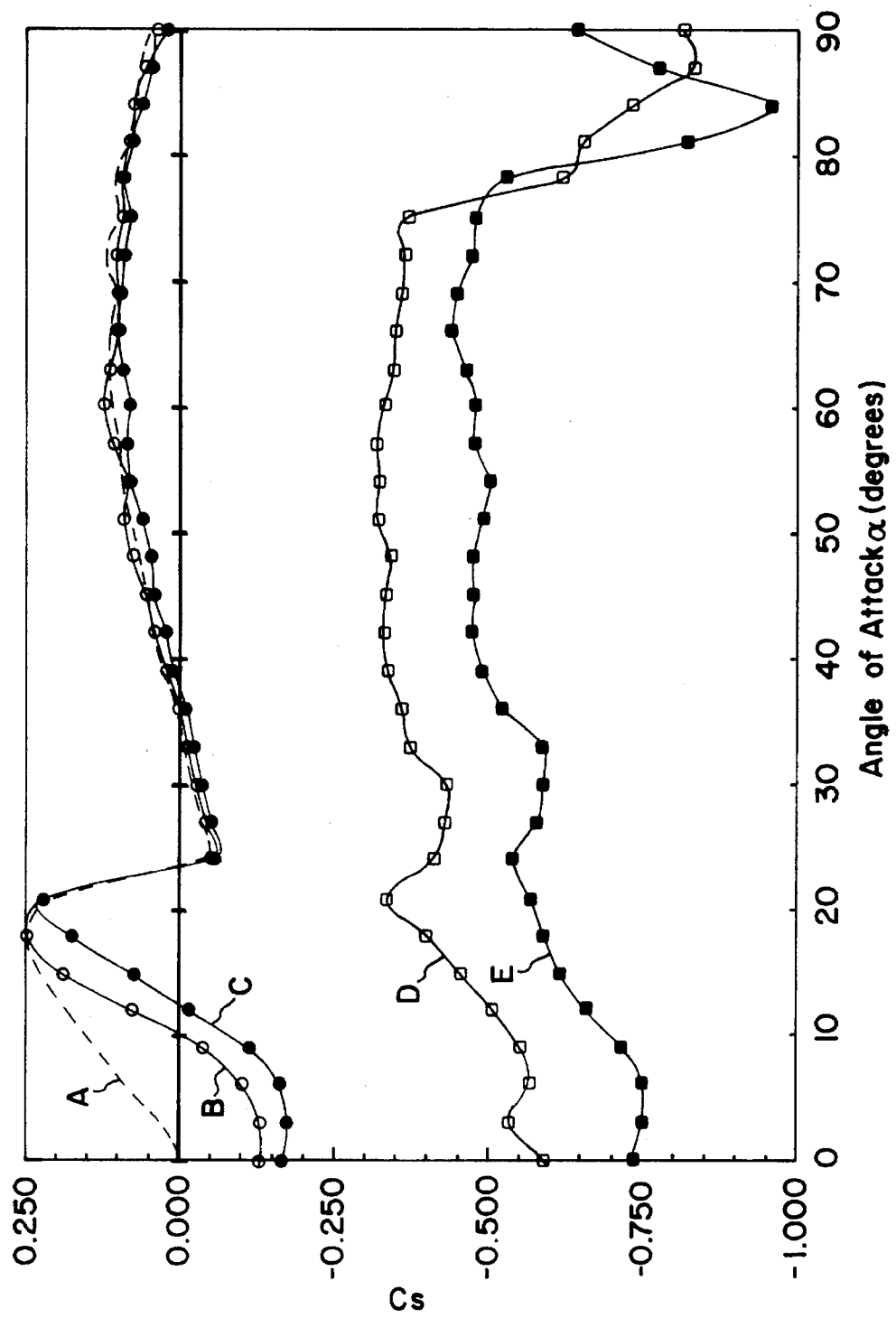
FIG. 14 is a graph showing control and braking device deflections at various angles of attack of a spoiler flap on a turbine blade.

FIG. 14 shows five sets of aerodynamic data. The aerodynamic data are presented to confirm the potential of the device as an aerodynamic control and braking device in two chord length configurations. The (No Device) case is shown to demonstrate the relative effect of the device on a particular airfoil. The two control cases are for device deflection angles of 10 degrees. The two braking configurations are shown at deflection angles of 90 degrees. It can be seen that the control and braking trends are similar for both chord lengths of the device.

Other variants are possible without departing from the scope of this invention.

What is claimed is:

1. In a wind turbine blade of the type which is adapted to rotate about an axis in response to wind moving over said turbine blade, wherein said turbine blade includes a forward portion, a rearward portion, an upper surface and a lower surface, wherein the improvement comprises: a braking device pivotably secured to said rearward portion of said blade; wherein said braking device comprises a spoiler flap having forward and rearward edges; wherein the distance between said forward and rearward edges of said flap is at least about 40% of the chord length of said blade; wherein said upper and lower surfaces of said blade adjacent said forward edge of said spoiler flap terminate within 10% of said chord length of each other; wherein said spoiler flap can be pivoted to simultaneously raise said forward edge and lower said rearward edge of said spoiler flap.

2. The improvement in accordance with claim 1, wherein said spoiler flap has upper and lower surfaces corresponding in shape to said upper and lower surfaces of said blade.

3. The improvement in accordance with claim 2, wherein said spoiler flap pivots about an axis which is generally parallel to said upper and lower surfaces.

4. The improvement in accordance with claim 3, wherein said axis defines a hinge line for said spoiler flap which is located at a point between said forward and rearward edges; wherein said point is between 40% and 60% of the distance between said forward and rearward edges.

5. The improvement in accordance with claim 2, wherein said forward edge of said spoiler flap includes a forwardly projecting lip member.

6. The improvement in accordance with claim 1, wherein the length of said spoiler flap is less than the length of said blade.

7. A turbine blade in accordance with claim 4, wherein said lower surface of said spoiler flap is concave.

8. A turbine blade in accordance with claim 7, wherein said upper surface of said spoiler flap is convex.

9. A turbine blade in accordance with claim 3, further comprising an extendable arm including first and second ends, wherein said first end is attached to said blade and said second end is attached to said spoiler flap at a point forwardly of said axis; and further comprising actuator means for extending said arm; and further comprising sensor means in said blade for sensing an overspeed condition of said blade and actuating said actuator means.

10. In an aircraft wing of the type which includes a forward portion and a rearward portion, an upper surface and a lower surface, wherein the improvement comprises: a braking device pivotably secured to said rearward portion of said wing; wherein said braking device comprises a spoiler flap having forward and rearward edges; wherein the distance between said forward and rearward edges of said flap is at least about 40% of the chord length of said wing; wherein said upper and lower surfaces of said wing adjacent said forward edge of said spoiler flap terminate within 10% of said chord length of each other; wherein said spoiler flap can be pivoted to simultaneously raise said forward edge and lower said rearward edge of said spoiler flap.

11. A method for controlling the flow of air over a turbine blade or wing, wherein said blade or wing includes a rearward portion, an upper surface and a lower surface; the method comprising the steps of:

(a) providing a spoiler flap having forward and rearward edges; wherein the distance between said forward and rearward edges is at least about 40% of the chord length of said blade or wing;

(b) pivotably mounting said spoiler flap in said rearward portion of said blade or wing; wherein said upper and lower surfaces of said blade or wing adjacent said forward edge of said spoiler flap terminate within 10% of said chord length of each other; and (c) pivoting said spoiler flap to simultaneously raise said forward edge into the low pressure flow and lower said rearward edge into the high pressure flow.

12. A wing in accordance with claim 10, wherein said forward edge of said spoiler flap includes a forwardly projecting lip member.

13. A wing in accordance with claim 10, wherein said spoiler flap includes a lower concave surface extending between said forward and rearward edges.

14. A wing in accordance with claim 13, wherein said spoiler flap includes an upper convex surface extending between said forward and rearward edges.

* * * * *